United States Patent Office 2,891,072
Patented June 16, 1959

2,891,072
PREPARATION OF DITHIANES

Nathaniel L. Remes, Elgin, and William A. Krewer, Arlington Heights, Ill., assignors to The Pure Oil Company, Chicago, Ill., a corporation of Ohio No Drawing. Application December 7, 1955
Serial No. 551,507

4 Claims. (Cl. 260—327)

This invention relates to the preparation of sulfur-containing, heterocyclic compounds. It is more specifically concerned with the synthesis of heterocylic hydrocarbons having two sulfur atoms in a hexatomic ring.

It is known that the sulfur analogue of dioxane, dithiane, as well as substituted dithianes, have a variety of uses. Compounds of this nature are useful as chemical intermediates. For example, addition compounds of dithiane and metallic salts, corresponding to dioxane addition compounds, have been prepared. Dithianes also have certain end applications without further reaction with other chemical compounds, and may be used per se as lubricating oil additives for imparting extreme pressure characteristics to mineral lubricating oils, as plasticizers for use in the preparation of synthetic and natural high molecular weight elastomers or polymers, etc. There are available in the prior art a number of preparations for synthesizing dithianes having the formula:

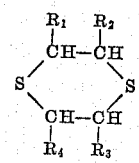

where $R_1$, $R_2$, $R_3$ and $R_4$ are hydrogen or a monovalent organic radical. It is known that olefins may be treated with sulfur dichloride and further reacted with sodium sulfide to yield 1,4-dithianes (Glavis, Ryden and Marvel, J. Am. Chem. Soc. 59, 707 (1937)). Another reaction involving the use of sodium sulfide as the sulfurizing agent involves the treatment of organic dibromides with sodium sulfide (Meadow and Reid, J. Am. Chem. Soc. 56, 2177 (1934)). Some work has also been reported on the use of activated alumina for catalyzing dithiane synthesis reactions. For example, this catalyst has been used in promoting the reaction between ethylene oxide and hydrogen sulfide at temperatures of about 200° C. to produce dithiane (Doklady Akad. Nauk (U.S.S.R.), 63, 285 (1948)). Other reactants which will interact with hydrogen sulfide in the presence of alumina at temperatures of 200°–400° C. to produce dithianes include diethylene thioglycol and p-oxathiane (Y. Yureva and K. Noutskii, Chem. Ab. 44, 1904 (1950)).

It has now been found that the production of dithianes may be facilitated without requiring a plurality of reactants for effecting the desired synthesis. It is therefore an object of this invention to provide a practical and economical method for the production of dithianes. This and other objects will be more apparent from the following detailed description of the instant invention.

According to this invention it has been discovered that alkylene sulfides may be converted to dithianes by heating them at an elevated temperature in the presence of an acidic-type of catalyst, including the so-called "Lewis acid" catalysts. Such compositions are well known in the prior art. For example, see Organic Chemistry, Fieser et al., Heath and Company, 1950, at page 140, et al.; Chemistry of Organic Compounds, Noller, Saunder, 1951, at page 235, and others. In the case of the lower alkylene sulfides the reaction is best carried out in a closed system at superatmospheric pressure; for higher boiling sulfides, the reaction may be carried out at atmospheric or subatmospheric pressure.

The following specific example is submitted to illustrate a suitable application of the instant invention and to show the results obtained thereby. It is to be understood that this example is for illustrative purposes and is not intended to place any restrictions or limitations on the subject invention.

Example 1

A mixture of 18.1 grams of propylene sulfide and 0.1 gram of p-toluenesulfonic acid was heated in a sealed vessel at 145–155° C. for 5¾ hours. The resulting product was dissolved in benzene, washed with water, and then with saturated sodium bicarbonate solution. Benzene and unreacted sulfide were stripped from the product by distillation at atmospheric pressure, and the residue was distilled at 38 mm. Hg. absolute pressure to yield 8.9 grams of product (B.P. 108–114° C.). The product had a refractive index of 1.5295 at 20° C., and a molecular weight of 141–145, as determined cryoscopically in benzene. The calculated molecular weight for 2,5-dimethyl-dithiacyclohexane (2,5-dimethyl-1,4-dithiane) is 148.

As will be apparent from the foregoing description and illustrative example, it is seen that the instant invention provides a practical method for the production of dithianes or substituted dithianes. The thiiranes which may be employed in carrying out the instant invention are represented by the following formula:

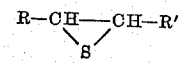

where R and R' are substituent groups which may be alkyl, aryl, alkylene or hydrogen, or non-hydrocarbon substituents such as sulfur-containing groups, hydroxy groups, carboxyl groups, or derivatives of carboxyl groups, or other functional groups which are unreactive in the reaction system. Typical sulfides which may be used in accordance with this invention include alkylene sulfides, such as ethylene sulfide, propylene sulfide, isobutylene sulfide, amylene sulfide, and other homologous saturated aliphatic sulfides. Exemplary of the unsaturated compounds which may be employed in carrying out the instant invention are butadiene monosulfide, isopropene monosulfide, etc. In addition, sulfides of cyclic compounds, including alicyclic, as well as aromatic compounds, such as cyclohexene sulfide or styrene sulfide, can be utilized. Examples of thiiranes containing substituents, such as ethers, nitriles, hydroxy groups, etc., include but are not limited to the thioglycidol derivatives, such as allyl thioglycidol ether, butyl thioglycidol ether, dithioglycidol ether, cyanoethylene sulfide, etc. or mixtures thereof.

The reaction may be carried out under atmospheric, superatmospheric, or subatmospheric pressures, at temperatures in excess of about 50° C. To effect the desired promotional effect in the efficiency of the reaction due to the acid-type catalyst, temperatures should not be high enough to inimically affect the stability of the acid catalyst used. Accordingly, it is preferred to carry out this invention at a temperature not in excess of about 200° C. Contact times will range from fractions of a second to 15 hours, depending upon the acid catalyst used, and the conditions under which the reaction is conducted. In the liquid phase, the reaction is carried out at pressures governed principally by the boiling point of the alkylene sulfide, and in the presence of the acid catalysts for periods ranging from 1 to 15 hours. In the vapor phase, the reaction is carried out in a flow system, using short contact times, and "Lewis acid" catalyst. In carrying out the reaction in the liquid phase, it may be desirable in some instances to use an inert diluent. Suitable diluents are liquids, under reaction conditions, in which the reactants are soluble, such as benzene, tetrahydronaphthalene, diphenyl ether, etc.

Acid catalysts (vide Oil and Gas Journal, March 21, 1955, at page 193, et seq., for brief discussion of acid catalysis), which may be employed in promoting the instant invention are not necessarily acids in the classical sense, i.e., the class of compounds designated as "Lewis acids." Non-limiting examples of suitable acid-type catalysts include compounds of silica, e.g., silica gel, silica-alumina; anhydrous inorganic halides, e.g., $AlCl_3$, $BF_3$; strong acids, e.g., sulfurous acids including sulfuric and sulfonic, phosphorus acids including phosphoric and phosphorous, hydrofluoric acid, and mixtures thereof. For the purpose of simplifying the interpretation of the appended claims, these catalysts will be referred to therein as "acid-type." In carrying out the process of this invention, only small amounts of catalyst are employed. In general, about 0.01 to 5% by weight, based on the sulfide feed, will be sufficient. However, amounts outside this range can be employed.

In recovering the reaction products from the reaction mixture, the dithia-compound is separated either by filtration or by extraction with an organic solvent in which the dithiane is soluble. Suitable solvents include benzene, petroleum hexane, ether, toluene, etc.

The invention claimed is:

1. A method for preparing substituted dithianes which comprises heating a thiirane of the formula

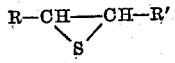

where R is selected from the group consisting of alkyl and aryl radicals, and R' is selected from the group consisting of hydrogen, alkyl, and aryl radicals, to a temperature of 50°–200° C., in contact with 0.01–5.0% of a sulfonic acid catalyst, based on the thiirane feed, and recovering a dithiane of the formula

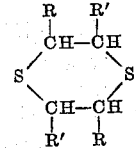

where the R and R' groups are as hereinbefore defined.

2. A method according to claim 1 in which the reactant thiirane is propylene sulfide.

3. A method according to claim 1 in which the catalyst is an arylsulfonic acid.

4. A method according to claim 2 in which the catalyst is p-toluenesulfonic acid, the reaction temperature is 145°–155° C., and the product is 2,5-dimethyl-1,4-dithiane.

References Cited in the file of this patent
UNITED STATES PATENTS

| | | |
|---|---|---|
| 1,018,329 | Lilienfeld | Feb. 20, 1912 |
| 2,183,860 | Coltof | Dec. 19, 1939 |
| 2,346,157 | Farrington | Apr. 11, 1944 |

OTHER REFERENCES

Beilstein: 17: 12, second supplement (1952).

Masson: Journal of the Chemical Society (London), vol. 49, pp. 233 to 249 (1886).

Delepine et al.: Bulletin des las Societe Chimique des France, vol. 33; pp. 703 to 711 (4th series).